(12) United States Patent
O'Neill et al.

(10) Patent No.: US 8,554,762 B1
(45) Date of Patent: Oct. 8, 2013

(54) DATA REPLICATION FRAMEWORK

(75) Inventors: Brian S. O'Neill, Bellevue, WA (US); Jason Shijia Long, Rochester Hills, MI (US); Archit Shivaprakash, Bellevue, WA (US); Olga I. Kuznetsova, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 140 days.

(21) Appl. No.: 12/980,193

(22) Filed: Dec. 28, 2010

(51) Int. Cl.
*G06F 17/30* (2006.01)
*G06F 17/00* (2006.01)

(52) U.S. Cl.
USPC ........... 707/715; 707/706; 707/713; 707/714; 707/716; 707/717; 707/718; 707/719; 707/721; 707/722; 707/736; 707/758; 707/782

(58) Field of Classification Search
USPC ......... 707/706, 713–719, 721, 722, 736, 758, 707/782, 999.003–999.006
See application file for complete search history.

(56) References Cited

U.S. PATENT DOCUMENTS

| | | | |
|---|---|---|---|
| 6,374,241 B1 * | 4/2002 | Lamburt et al. ....................... 1/1 |
| 7,062,556 B1 * | 6/2006 | Chen et al. .................... 709/226 |
| 7,565,419 B1 | 7/2009 | Kwiatkowski et al. |
| 7,925,655 B1 * | 4/2011 | Power et al. ................... 707/741 |
| 8,037,076 B2 * | 10/2011 | Schneider .................... 707/747 |
| 2001/0042139 A1 | 11/2001 | Jeffords et al. |
| 2002/0083200 A1 | 6/2002 | Haulund et al. |
| 2003/0158842 A1 * | 8/2003 | Levy et al. ........................ 707/3 |
| 2003/0233403 A1 * | 12/2003 | Bae et al. ...................... 709/203 |
| 2004/0010588 A1 * | 1/2004 | Slater et al. ................... 709/224 |
| 2004/0047354 A1 * | 3/2004 | Slater et al. ................... 370/400 |
| 2004/0148317 A1 | 7/2004 | Sundararajan et al. |
| 2005/0027862 A1 * | 2/2005 | Nguyen et al. ................ 709/225 |
| 2005/0080801 A1 | 4/2005 | Kothandaraman et al. |
| 2006/0026117 A1 * | 2/2006 | Raman et al. ...................... 707/1 |
| 2006/0041560 A1 * | 2/2006 | Forman et al. ................... 707/10 |
| 2006/0190243 A1 * | 8/2006 | Barkai et al. ...................... 704/8 |
| 2006/0245433 A1 * | 11/2006 | Berg et al. ................ 370/395.31 |
| 2008/0033911 A1 * | 2/2008 | Raman et al. ..................... 707/2 |
| 2008/0126704 A1 * | 5/2008 | Ulrich et al. .................. 711/114 |
| 2008/0250099 A1 * | 10/2008 | Shen et al. ..................... 709/203 |
| 2008/0288577 A1 | 11/2008 | Clubb et al. |
| 2009/0012932 A1 * | 1/2009 | Romem et al. .................... 707/2 |
| 2010/0161617 A1 * | 6/2010 | Cao et al. ....................... 707/741 |
| 2010/0242092 A1 * | 9/2010 | Harris et al. ....................... 726/3 |
| 2010/0287171 A1 * | 11/2010 | Schneider ..................... 707/759 |
| 2010/0332513 A1 * | 12/2010 | Azar et al. .................... 707/769 |

OTHER PUBLICATIONS

Gopalakrishman, V., et al., Adaptive Replication in Peer-to-Peer Systems, IEEE 2004, pp. 10.

* cited by examiner

*Primary Examiner* — Syling Yen
(74) *Attorney, Agent, or Firm* — Knobbe Martens Olson & Bear LLP

(57) ABSTRACT

Generally described, the present disclosure is directed to an eventually consistent replicated data store that uses, for its underlying storage, a computer software library that provides a high-performance embedded database for data. The replicated data store employs a plurality of hosts interconnected to one another, allowing for writes to any host and full awareness of membership across all hosts. With the data replication framework disclosed herein, various modes are allowed to be built up on top of the core system.

19 Claims, 13 Drawing Sheets

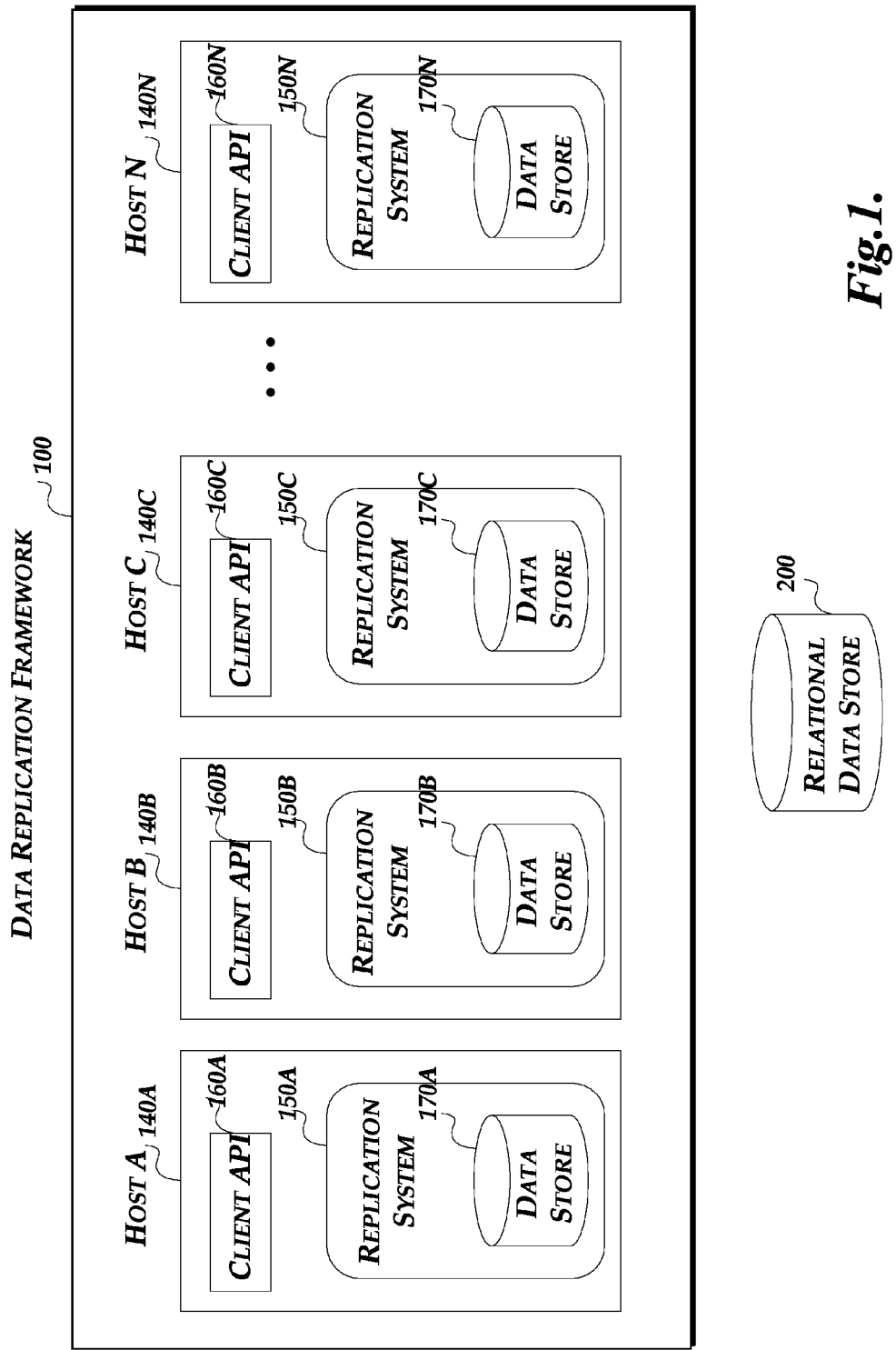

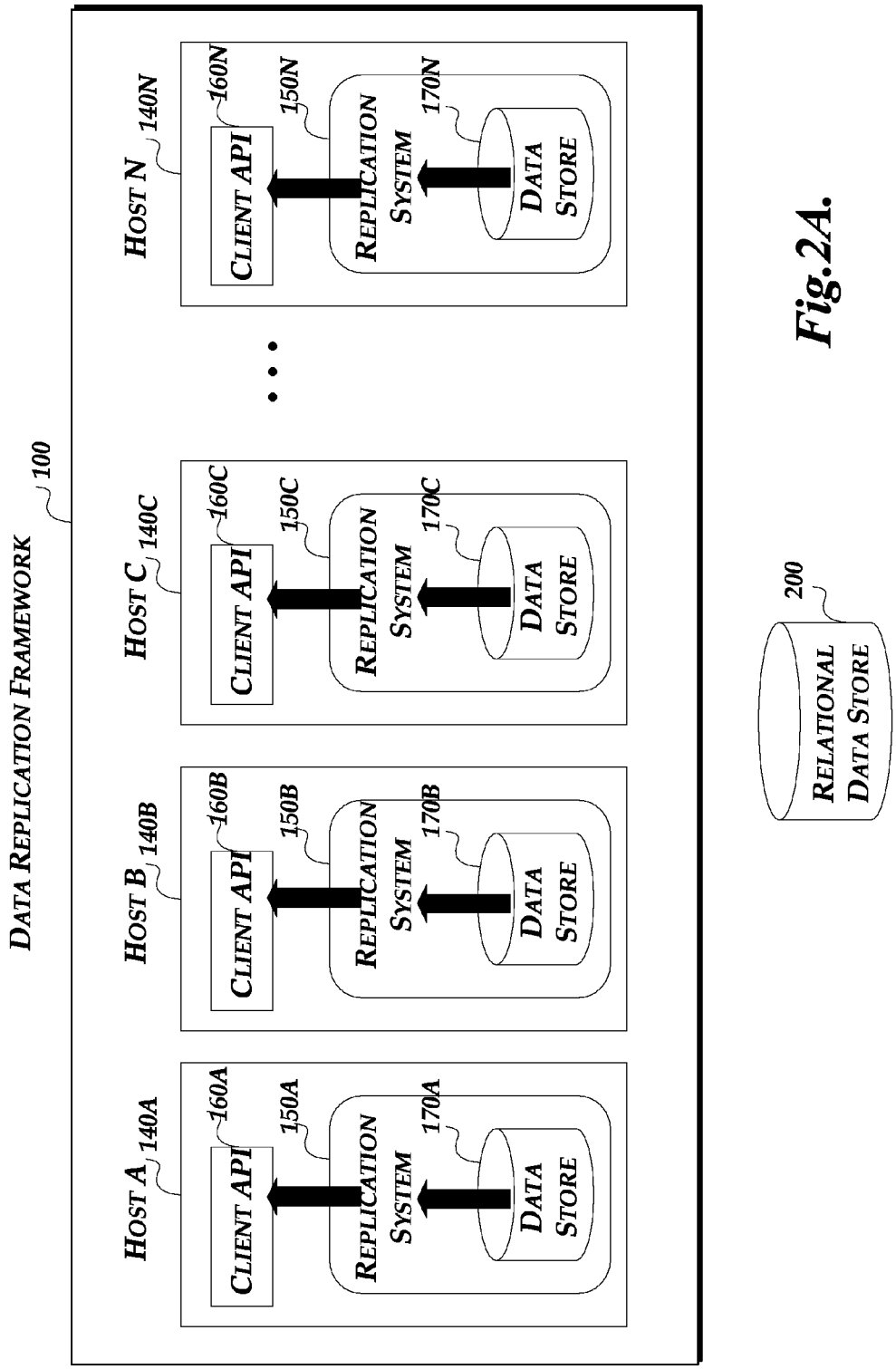

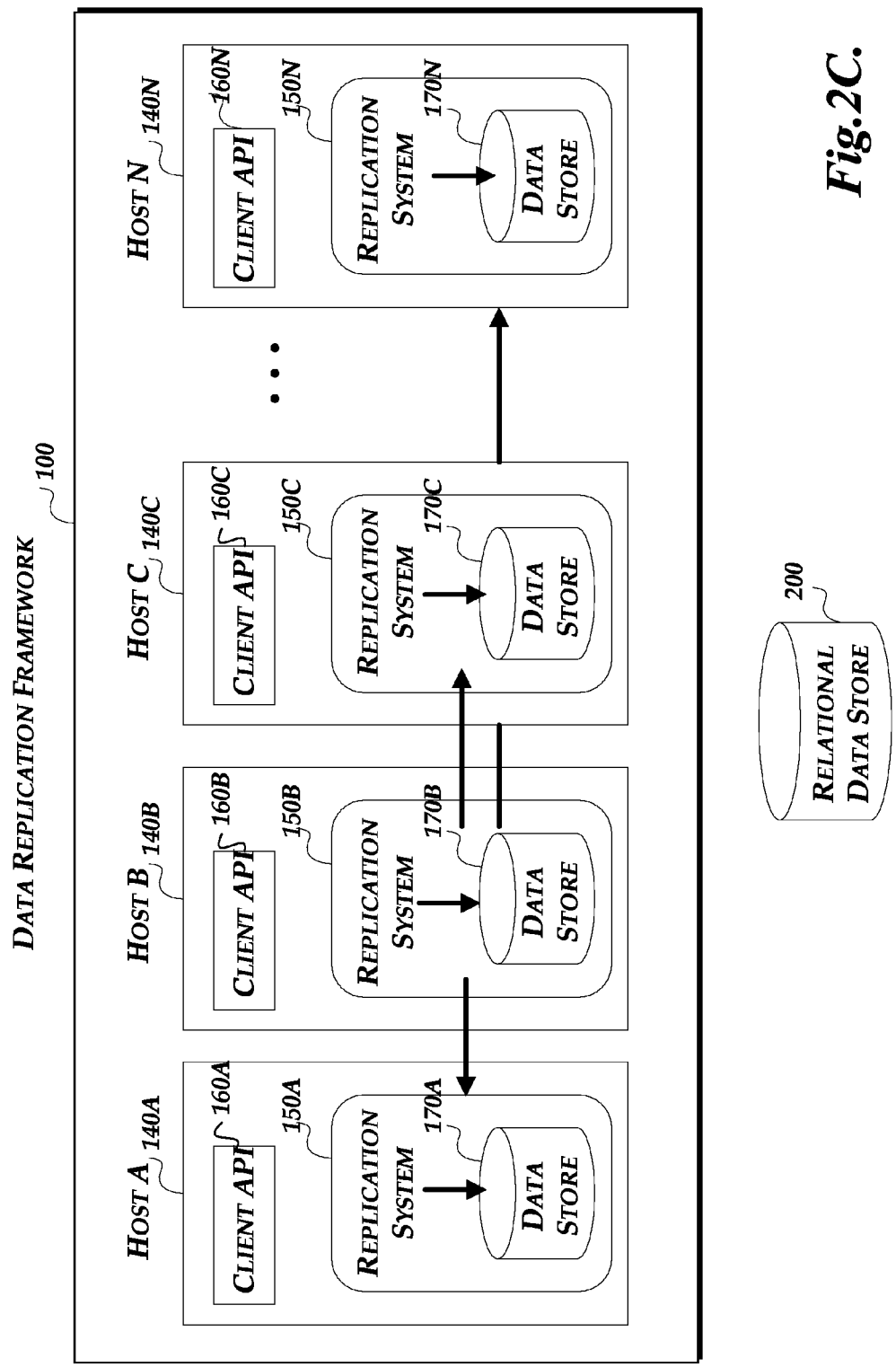

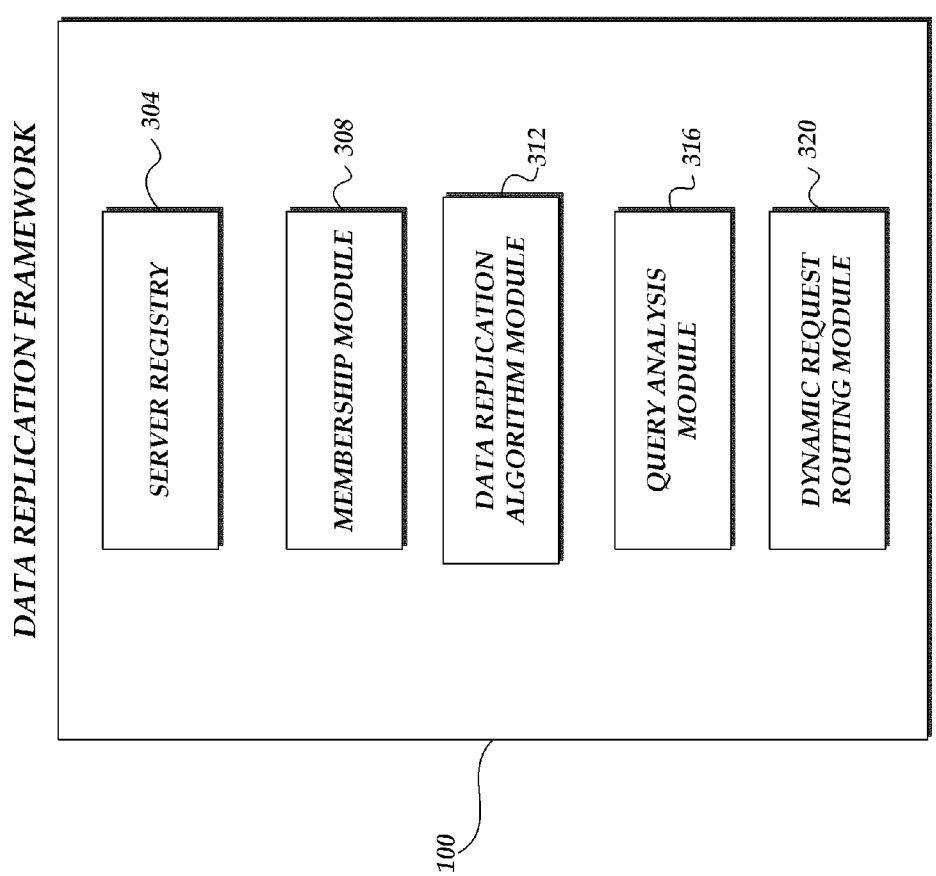

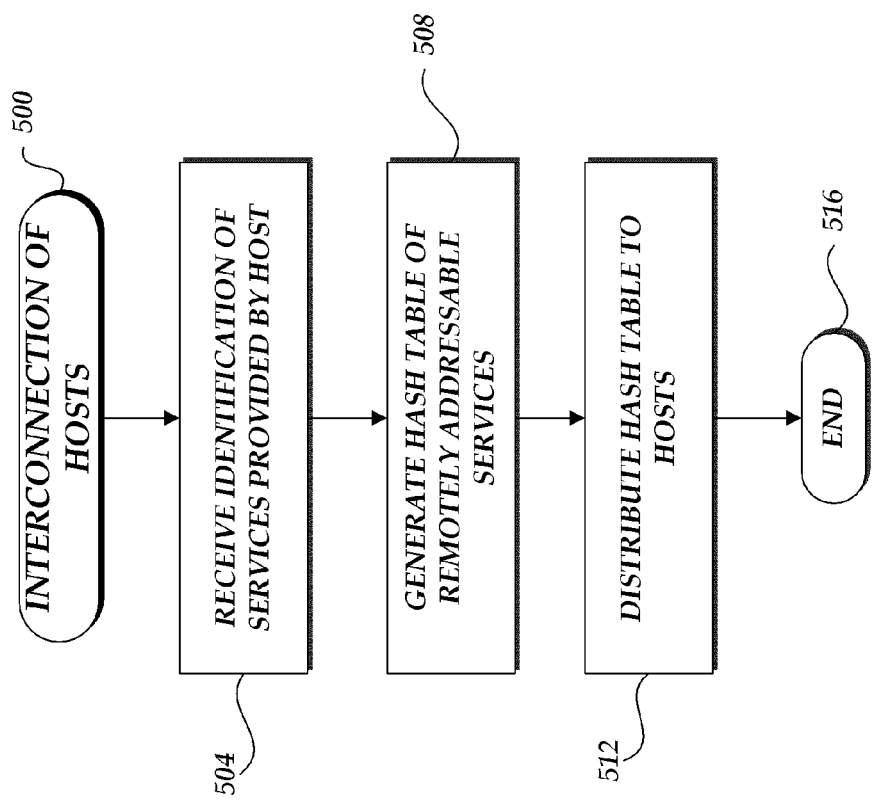

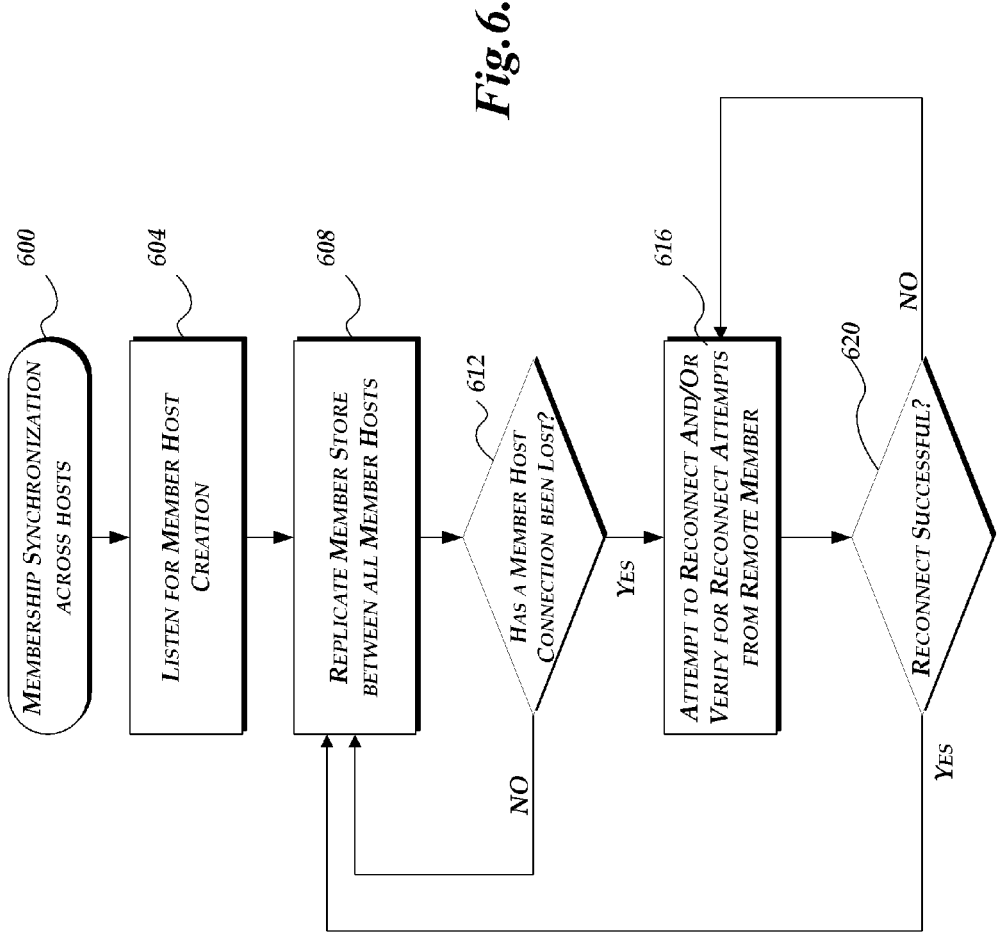

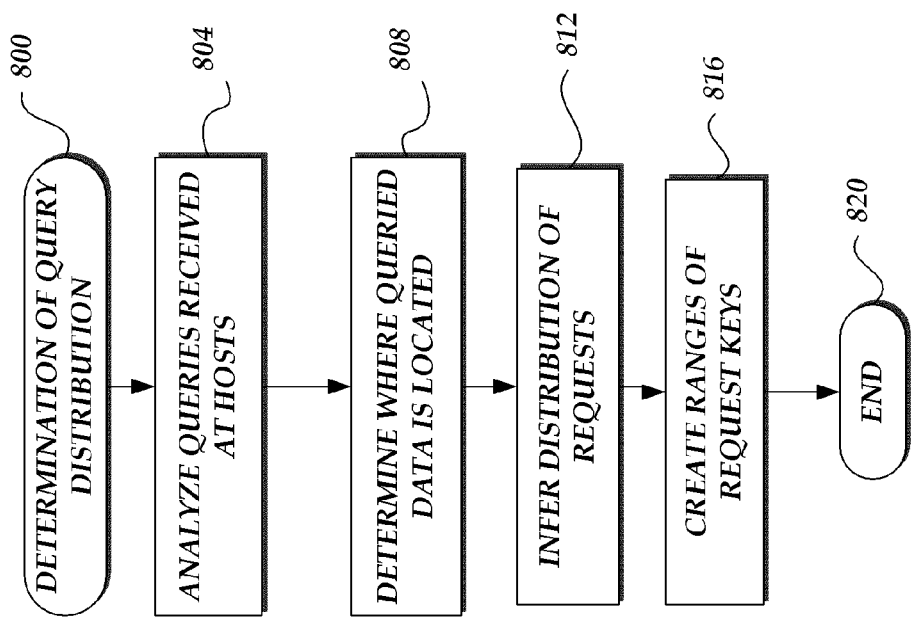

DATA REPLICATION FRAMEWORK

BACKGROUND

Generally described, replication is a set of technologies for copying and distributing data and database objects from one database to another and then synchronizing between databases to maintain consistency. Using replication, data may be distributed to different locations and to remote or mobile users over local and wide area networks, dial-up connections, wireless connections, and publicly accessible networks of networks, such as the Internet.

Transactional replication can be used to replicate transactional data, such as a database or other form of transactional storage structure. Database replication can be used to describe scenarios in which database management systems attempt to replicate data in order to ensure consistency between redundant resources. Database replication can commonly be associated with master/slave relationship between the original and the copies. In a master/slave relationship, one database may be regarded as the authoritative source of data, and the slave databases are synchronized to it. The master logs the updates, and the updates are then sent to the slaves in order to synchronize them. The slave outputs a message stating that it has received the update successfully, thus allowing the sending (and potentially re-sending until successfully applied) of subsequent updates.

Multi-master replication, where updates can be submitted to any database node, and are then sent through to other servers for synchronization, is often desired, but may introduce substantially increased costs and complexity which may make it impractical in some situations. One common challenge that exists in multi-master replication is transactional conflict prevention or resolution. Most synchronous replication solutions do conflict prevention. Conflict prevention is typically accomplished by not considering a write operation completed until an acknowledgement is received by both the local and remote databases. Further writes wait until the previous write transaction is completed before proceeding. Most asynchronous solutions do conflict resolution. Conflict resolution is typically accomplished by considering a write operation completed as soon as the local database acknowledges the write. Remote databases are updated, but not necessarily at the same time. For example, if a record is changed on two nodes simultaneously, a synchronous replication system would detect the conflict before confirming the commit and would abort one of the transactions. An asynchronous replication system would allow both transactions to commit and would run a conflict resolution during resynchronization. The resolution of such a conflict may be based on a timestamp of the transaction, on the hierarchy of the origin nodes or on more complex logic.

Database replication becomes difficult when it the number of databases and/or the locations between the databases increases. Typically, a centralized relational database may be used to store data for a variety of services across several hosts. In such a system, a simple request for data would be sent to all the hosts, and each of the hosts would need to access the relational database to obtain the requested data. The plurality of access requests to the centralized relational database may strain the database. One solution has been to use localized caches on the hosts, to reduce the number of access requests to the centralized database. The localized caches typically store local copies of frequently accessed data, thereby reducing the number of access requests to the centralized database. The use of caches may thus allow for some scalability. However, as the data requirements grow, and larger caches are needed, there may be issues such as shortage of random-access-memory (RAM). The use of multiple caches may create coherency issues. Sticky routing may not always be applicable to such systems. When the number of hosts and associated caches is scaled to a large enough number, the centralized relational database may simply get overloaded and become unresponsive.

One possible solution to the overloading of a centralized relational database has been to scale with partitions. Caches on the hosts may be partitioned to access multiple relational databases. However, such a solution does not really improve availability, since the two databases are not replicates of one another. Overall, basic caching is not ideal since cache parameters require tuning, partitioning becomes a necessity, use of more partitions means more failures, and availability is not improved.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a system diagram illustrative of a data replication framework including a plurality of hosts and local data stores;

FIGS. 2A-2D are system diagrams of the data replication framework of FIG. 1 illustrating different modes of operation;

FIG. 3 is a block diagram of the data replication framework of FIG. 1 functional modules;

FIG. 5 is a flow diagram illustrative of interconnection of hosts implemented by the server registry;

FIG. 6 is a flow diagram illustrative of membership synchronization across hosts, as implemented by the membership module;

FIG. 8 is a flow diagram illustrative of determination of query distribution implemented by the query analysis module.

DETAILED DESCRIPTION

Figure 2B:
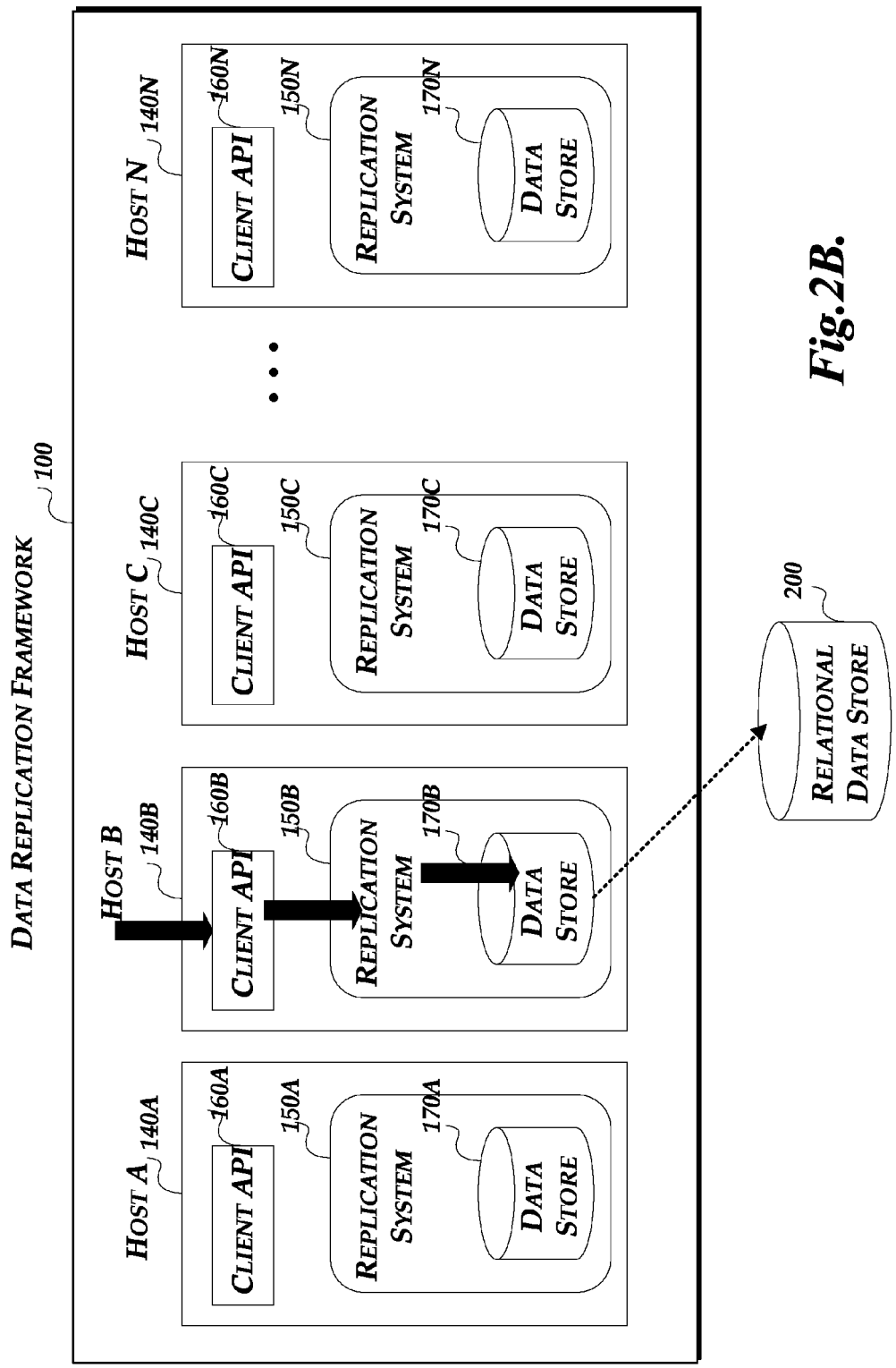

Generally described, the present disclosure is directed to an eventually consistent replicated data store that uses, for its underlying storage, a computer software library that provides a high-performance embedded database for data. The replicated data store employs a plurality of hosts interconnected to one another, allowing for writes to any host and full awareness of membership across all hosts. With the data replication framework disclosed herein, various modes are allowed to be built up on top of the core system. For example, a partitioning strategy may be built on top of the system. An authoritative store may also be built on top of the system. The underlying data replication framework storage does not need to change for new features to be added, and multiple layers can be utilized at the same time.

Specifically, in one aspect, the data replication framework can maintain a network of interconnected hosts with updated membership state information across the hosts without the use of a centralized storage system. In another aspect, the data replication framework can implement storage agnostic data replication across the network of interconnected hosts, where membership information is taken into consideration for replication strategies. In another aspect, the data replication framework enables consistent data replication across the network of hosts using features such as version numbers of data records and hosts acting as redundant senders of data. In another aspect, access requests for data from the hosts can be dynamically routed to perform load balancing.

Although various aspects of the disclosure will be described with regard to illustrative examples and embodiments, one skilled in the art will appreciate that the disclosed embodiments and examples should not be construed as limiting.

The core replication system described herein runs on a cluster of hosts. The hosts are interconnected and each host is aware of the existence of each other host. The cache on each of the hosts is a complete copy of the data. Such a system provides for both better availability and better scalability.

FIG. 1 is a system diagram illustrative of a data replication framework 100. The framework includes a replicated storage product composed of the following: a set of hosts 140A-140N each running a storage engine, 170A-170N; replication systems 150A-150N running on each of the hosts 140A-140N and client application programming interfaces (API) 160A-160N. The replication systems 150A-150N replicate data across the hosts, guaranteeing they converge to the same state, bootstrap new hosts and transfer data when repartitioning. The client APIs 160A-160N can do local or remote reads of the data, coordinate writes/updates by communicating with the replication systems while providing several consistency levels, and understand partitioning and route requests accordingly.

Illustratively, the framework 100 supports relational queries from any one of the hosts 140A-140N. Data is replicated on each of the hosts 140A-140N on the local data store 170A-170N. Each of the local data stores 170A-170N may consist of a computer software library that provides a high-performance embedded database for data. As will be described below, the plurality of hosts 140A-140N are interconnected such that each host is aware of the existence of each other host. In some embodiments, the data replication framework 100 may also be in communication with an external relational data store 200 for authoritative storage.

Figure 2D:
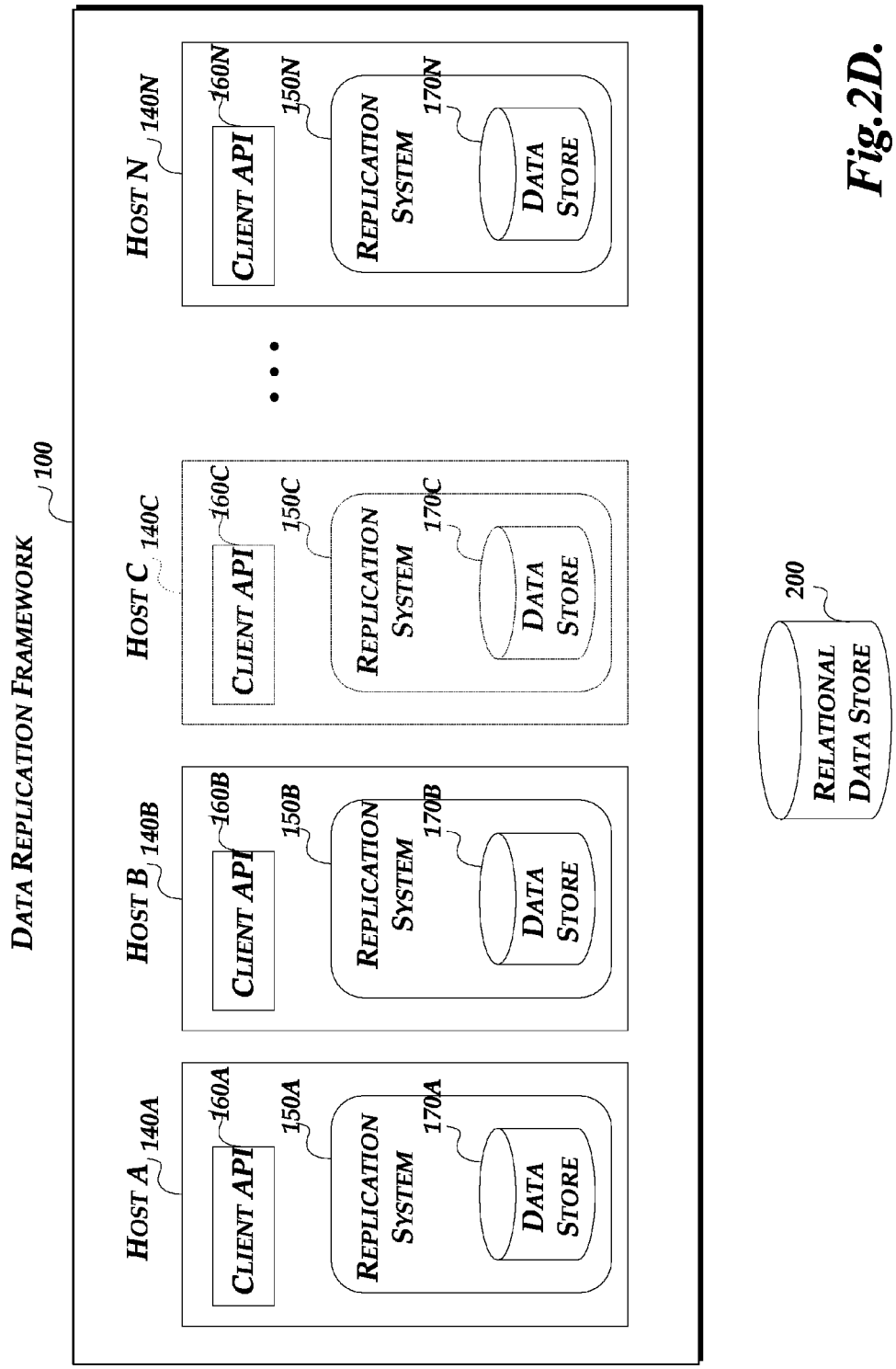

FIGS. 2A-2D are system diagrams of the data replication framework 100 of FIG. 1 illustrating different modes of operation. FIG. 2A illustrates a read operation. FIG. 2B illustrates a write operation. FIG. 2C illustrates a replication operation from one host to all other hosts. FIG. 2D illustrates operation of the framework while one host is unavailable. These modes of operation will be further described below.

As illustrated in FIG. 2A, when an access request for data is received at the data replication framework 100, the data is locally read at one of the hosts 140A-140N. There is no need to for an access request from the hosts 140A-140N to a centralized relational database 200 for a data read, since each of the hosts 140A-140N includes a local data store 170A-170N including a replicate of all of the data that would be stored at the centralized relational database 200. In this framework, if the centralized relational database 200 were to become unavailable, data would still be available to be read at any one of the hosts 140A-140N. Additionally, the number of hosts may be scaled to any number, independent of the capacity of the relational database 200.

FIG. 2B illustrates a write operation. Data received by the data replication framework 100 may be received at any one of the hosts 140A-140N. Any write request going to a host in the cluster of hosts 140A-140N will get written on the respective local data store 170A-170N as well as sent out to all other hosts 140A-140N in the replication system 100, without needing to replicate the data to the centralized database 200. FIG. 2B also illustrates the optional writing of data from one of the hosts 140A-140N to a centralized location, which may be the relational database 200. The data written to one of the hosts 140A-140N may be written from the host to the centralized relational database 200. As an illustrative example, the data replication framework 100 may receive data indicating that the price of an article is $4.95. This data may be received at host 140B, and locally stored in data store 170B.

FIG. 2C illustrates the replication of data from one of the hosts 140A-140N to all other hosts 140A-140N. Data received from the data replication framework 100 is written to one host from the plurality of hosts 140A-140N. The data is then replicated from that host, acting as sender, to all other hosts in the plurality of hosts 140A-140N, without the use of the centralized database 200. Following on the example above, the article price of $4.95 received by host 140B would be replicated to hosts 140A and 140C-140N without writing the article price to the centralized database 200.

Illustratively, persistent replication includes propagating data from one host to other hosts and receiving acknowledgments from the other hosts. When an acknowledgment is not received by one of the hosts, the sender retries to send the data until an acknowledgment is received. However, acknowledgments may be lost, and/or data changes may arrive to hosts out of order. The data replication from one host to other hosts implemented by different embodiments of the data replication framework 100 may be performed in conjunction with several features to improve the consistency and availability of data across the hosts. Some examples of these features may include the use of version numbers associated with the data being replicated, the use of recorders associated with the transmission of data between hosts.

For illustrative purposes, let us continue with the example above, but assuming there are a total of 4 hosts, for simplicity of description. Host 140B receives data indicating that the price of a given article is $4.95. Host 140B then sends this article price to hosts 140A, 140C, and 140D. Host 140B receives acknowledgments from hosts 140A and 140C, but not host 140D. Therefore, host 140B retries to send the article price to host 140D. However, assume that between the time of the send and the retry, host 140B receives data indicating that the price of the article is now $1.49. Host 140B sends this data to hosts 140A, 140C, and 140D. Then, host 140B retries sending the price of $4.95 to host 140D, and this time host 140D acknowledges receipt. Now, hosts 140A-140C have data indicating $1.49 for the price of the article, while host 140D has $4.95. This creates an inconsistent group of hosts.

In some embodiments of the data replication framework 100, the inconsistency of data across hosts, such as for example the inconsistent article price above, may be addressed by the use of version numbers for data records. Accordingly, in an illustrative embodiment, data records may be given a version number which is incremented with each update. If a host 140A-140N receives a change of data for a record with an older version number than the version locally stored, then the host 140A-140N would reject the data record. In some embodiments, the version numbers for the records may be provided by the centralized relational database 200. The generation and use of version numbers is described in further detail below.

Returning to the example above, this time with the use of version numbers, host 140B receives data indicating that the price of a given article is $4.95, and this price would be associated with a version 1. Host 140B then sends this article price and version number to hosts 140A, 140C and 140D. Host 140B receives acknowledgments from hosts 140A and 140C, but not host 140D. Therefore, host 140B retries to send the article price with version number 1 to host 140D. However, assume again that between the time of the first send and the second try, host 140B receives data indicating that the price of the article is now $1.49, associated with a version number 2. Host 140B sends this price and version number to hosts 140A, 140C, and 140D and receives acknowledgments from hosts 140A, 140C, and 140D. Then, host 140B retries sending the price of $4.95 with version 1 to host 140D. Host 140D has a locally stored price of $1.49 with a version number 2 associated with it, and therefore host 140D rejects the price of $4.95 with version number 1, and sends an acknowledgment to host 140B. Now, hosts 140A-140D have data indicating $1.49 for the price of the article. This creates consistent data across the group of hosts.

FIG. 2D illustrates embodiments in which one of the hosts 140A-140N is temporarily unavailable to the other hosts for sending and/or receiving data. When one of the hosts 140A-140N desires to replicate a data write to all other hosts 140A-140N, as a sender, and one of the other hosts 140A-140N is unavailable, there may be issues such as data inconsistencies and sender crashes that need to be addressed. Continuing with the example above, the article price of $4.95 may be successfully replicated to hosts 140A and hosts 140D-140N, but not to host 140C, since host 140C is temporarily unavailable.

The data replication framework 100 may include functionalities such as continuous monitoring of the unavailable host. The continuous monitoring of the unavailable host helps to determine when data should be resent to that host. The continuous monitoring of the host also helps to determine when to declare that host permanently unavailable. Details about the implementation of the continuous monitoring are described further below.

In other embodiments, the host sending data, such as host 140B in the example above, may become temporarily unavailable during sending, or at any other time, or the sender host's memory may reach capacity. These situations may also cause inconsistent data replication across the hosts. In some embodiments, the data replication framework 100 may include recorders. Recorders are hosts that are responsible for recording data being sent from a host so that the recorders can later provide the data to the sending host if the sending host becomes temporarily unavailable. Recorders also receive the acknowledgments from other hosts for the original sender. The use of recorders enables consistent replication across hosts 140A-140N.

Continuing with the example above, hosts 140A-140D had a price of $1.49 with version number 2 on the local stores 170A-170D. Let us suppose that host 140A then receives a price of $2.34 for the article, with a version number 3. Host 140A writes this price of $2.34 to its local data store 170A (see FIG. 2B). Host 140A will also want to replicate this data to hosts 140B-140D. In embodiments where at least one recorder is used, host 140A sends the data to hosts 140B-140D, and selects at least one of the hosts, say host 140B, as the recorder. Host 140A may receive acknowledgments from host 140B and 140C, but not host 140D. Then, the host 140A may become temporarily unavailable. At that point, host 140B would take over for 140A and resend the price of $2.34 to host 140D. Host 140B, as recorder, would also keep track of acknowledgments received from host 140D. Then, when host 140A becomes available again, Recorder 140B sends the acknowledgment information received from host 140D to host 140A. Through the use of the recorder, the data change received by host 140A is successfully replicated to other hosts even when host 140A becomes temporarily unavailable. Also, the acknowledgments are received by the host 140A, and therefore the changes are not attempted to be sent after the host 140A becomes available.

A recorder provides redundancy for the sender. Recorders are picked for each change that will persist if the host 140A-140N that originally received the change goes down, as well as to receive additional acknowledgments from all hosts 140A-140N that they have received the change. Recorders are described in further detail below in connection with the description of the data replication algorithm.

In yet another aspect, the data replication framework 100 can facilitate the adding new hosts as group members without having to stop read and/or write operations on existing hosts and without losing data changes across the existing hosts. A new host added subscribes to the group of hosts 140A-140N. Data existing at the hosts 140A-140N is copied in one write operation from one of the peer hosts to the newly joining host, while the hosts 140A-140N continue to accept any new changes. A full change history of all changes made to the data, such as the several different versions of the price of an article in the example above, need not be kept at any of the hosts 140A-140N.

To illustrate the addition of a new member (or host), let us continue with the example above, where the group of existing hosts are hosts 140A-140D. Each of hosts 140A-140D is aware of its respective peers/members. Host 140A has peers 140B, 140C and 140D. host 140B has peers 140A, 140C, and 140D. host 140C has peers 140A, 140B, and 140D. Host 140D has peers 140A, 140B, and 140C. Then, assume a new host 140E joins the group. Host 140E may be added to the list of peers for any one of the existing hosts 140A-140D. Say it is added to the list of peers for host 140A. The updated list of peers/membership is replicated from host 140A to hosts 140B, 140C, and 140D. Then, the data on host 140A is cloned onto host 140E. Host 140E sends an indication of readiness to hosts 140A-140D. The new changes arriving to hosts 140-140D are recorded, but not yet sent to host 140E. These changes are sent after host 140E has been restored.

In still further embodiments, the data replication framework 100 can facilitate consistency in scenarios where one of hosts 140B or 140C becomes temporarily unavailable before receiving the updated list of peers/membership from host 140A in the example above. The data replication framework 100 enables membership and replication strategies to be separate from one another, through the use of a server registry and a membership module, as well as a data replication algorithm, as will be described in reference to FIGS. 3-7 below. When new hosts join a group of existing hosts, there may be situations where races are created and there may be risks of changes being lost. The changes acknowledged from the newly joined host remain, and a purge message is sent when durable, as a checkpoint. Then the list of peers/membership is passed with the purge message. The use of purge messages is described in further detail below.

Continuing the example above, assume host 140B becomes temporarily unavailable. Host 140A sends a purge message of acknowledged changes for membership (of hosts 140A-140E) to hosts 140A, 140C-140E. Then host 140B becomes available again When host 140A attempts to send a purge message of acknowledged changes for membership (of hosts 140A-140E) to host 140B, host 140B realizes that it needs to update its roster. Then host 140B updates its roster adding host 140E to it, and sends an acknowledgment to host 140E. Then host 140A successfully sends the purge change message to host 140B.

FIG. 3 is a block diagram of the data replication framework of FIG. 1. The data replication framework 100 enables the functionalities described above, as well as other features and functionalities to be described further below through a server registry 304, a membership module 308, a data replication algorithm module 312, a query analysis module 316 and a dynamic request routing module 320. Specifically, the data replication framework 100 can include a server registry 304 and a membership module 308 each corresponding to one or more server computing devices for monitoring, updating, and synchronizing membership information across the hosts 140A-140N. The data replication framework 100 can further include a data replication algorithm module 312 corresponding to one or more computing devices for replicating data across the hosts 140A-140N. The data replication framework 100 can further include a dynamic request routing module 320 and an associated query analysis module 316, each corresponding to one or more computing devices for rerouting data requests among hosts 140A-140N in order to more evenly balance data requests across the hosts 140A-140N.

One skilled in the relevant art will appreciate that the data replication framework 100 can be associated with various additional computing resources, such additional computing devices for administration of content and resources and the like. Additionally, although the server registry 304, the membership module 308, the data replication algorithm module 312, the query analysis module 316 and the dynamic request routing module 320 are logically connected to the hosts 140A-140N, these modules may be geographically distributed throughout a communication network in a manner to best serve various demographics of hosts 140A-140N.

Figure 4:
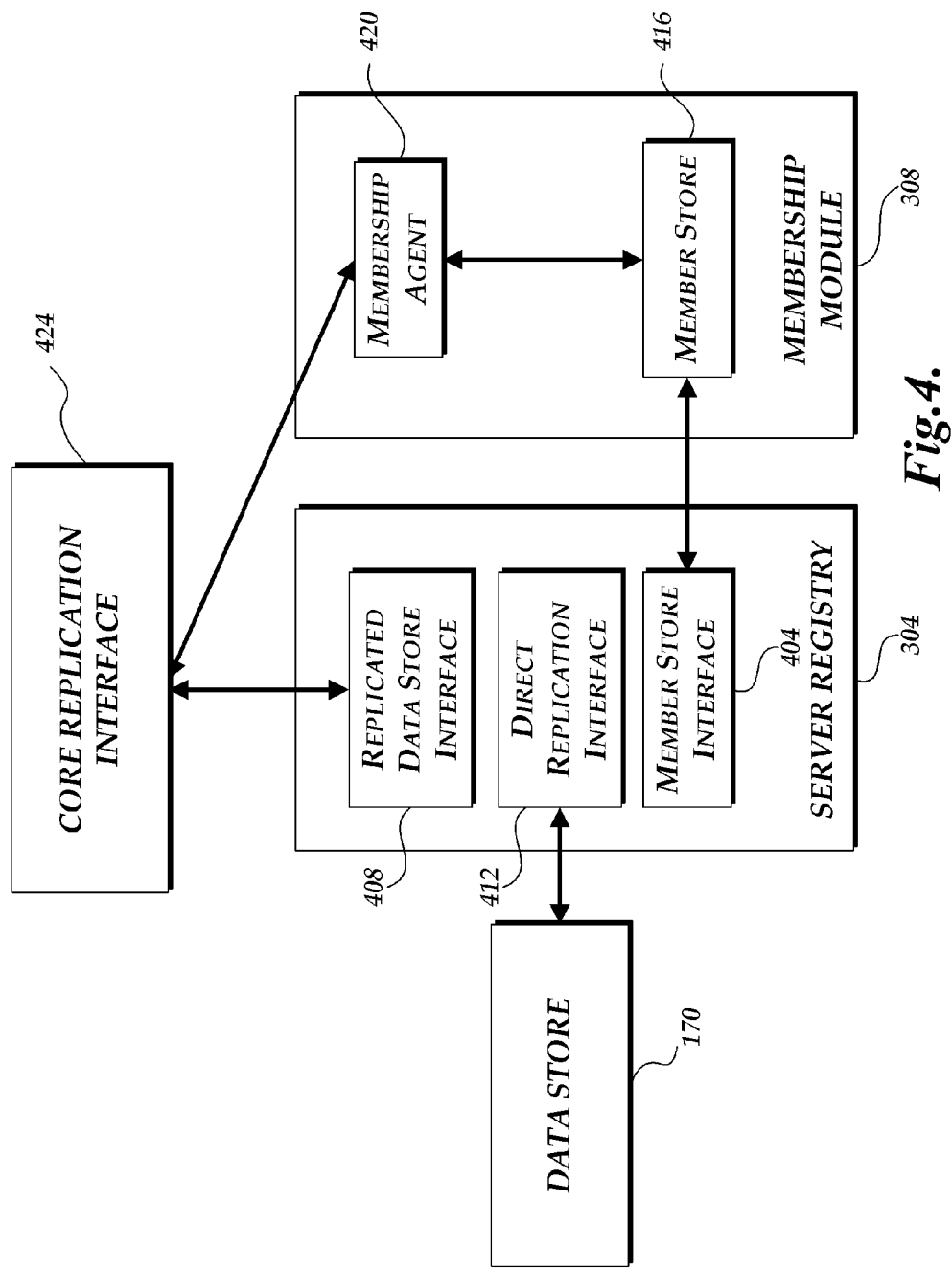
FIG. 4 is a block diagram of the interconnection between some of the modules in FIG. 3.

FIG. 4 is a block diagram of the interconnection between the server registry 304, the membership module 308, the data stores 170A-170N and a core replication interface 424. With reference to FIG. 4, before a new host can join a group of existing hosts 140A-140N, the new host must be able to access all existing hosts. Additionally, all existing hosts 140A-140N must also be able to access each other. The server registry 304 is a small non-persisted replication system which replicates available hosts 140A-140N. This allows all hosts 140A-140N to be aware of each other and exchange information. When a host connection is established to the server registry 304, all existing host sessions 140A-140N are instructed to connect to the new host. This forms a fully connected mesh network between all hosts 140A-140N; the hosts 140A-140N are fully interconnected to one another. When a host connection is lost, it is removed from the server registry 304.

As illustrated in FIG. 4, the server registry 304 may include a member store interface 404 to exchange membership state in the member store 416 of the membership module 308. The server registry 304 may also include a replicated data store interface 408 to remotely persist changes to the core replication interface 424. The server registry may also include a direct replication interface 412 to remotely persist changes to a specific member's data store 170A-170N. These interfaces 404, 408 and 412 provide the core query and update methods. Illustratively, the core replication interface 424 coordinates all replication interaction and accesses the membership agent 420 of the membership module 308. The membership agent 420 persists state via the member store 416, which in turn persists into the same data store as used by the data stores 170A-170N.

In an illustrative embodiment, the member store 416, in communication with the membership agent 420, persists known group host members 140A-140N and their state. The state of a host member 140A-140N may be, for example, eligible or ineligible. A host may be considered ineligible when it is temporarily or permanently unavailable. The member store 416 shares the same data store as that used for data storage on the hosts 140A-140N. In other embodiments, the data store for the member store 416 may be separate. A logical mapping may be used to persist member state, although it is indexed too. The member store 416 maps member ID to network address and a state, where address may be an IP host name plus a TCP port. Member ID may be a randomly chosen ID. Additional fields persisted in the record may include the peer restoration parent, a last modified timestamp, and an optional timestamp indicating when a member became incommunicado. Illustratively, a record exists for a given member ID, but multiple records may exist with the same network address. This allows data stores 170A-170N to be migrated to different hosts 140A-140N and also allows dynamically assigned addresses to change. When a member connection to an address is confirmed, all other member records with that same address are deleted from the member store 416. The membership agent 420 is responsible for replicating member stores 416 in a way to ensure that the stores 416 are ultimately consistent with each other.

When a member state indicates eligible, then the member is considered a valid member of the replication group. All changes are replicated to all eligible members. If a member is temporarily ineligible, changes will be replicated to that member when it becomes eligible again. If a member is ineligible for an extended period of time, the member will be marked as permanently ineligible. All pending changes for that member can be safely discarded. A member state cannot transition backwards from being permanently ineligible to being eligible, because pending changes will be permanently lost. Members marked as permanently unavailable must acquire a new identity (a new ID) and then restore all data from an eligible peer. Once a permanently unavailable member record is created in the member store 416, the only way for this record to be deleted is if the address is re-used for another member ID. A timestamp may be stored for each permanently unavailable member record. The permanently unavailable member records which exceed a maximum threshold of time, such as for example over a year, may be deleted. In various embodiments, the length of time may be configurable, and may be shorter or longer than a year.

Another property stored in the record of the member store 416 is a timestamp indicating when a member started to be unavailable. The actual member state is still eligible until the membership agent 420 declares it to be permanently unavailable. Persisting the unavailable timestamp allows the membership agent 420 to continue determining the availability of the member from where it left off, in case the member becomes available again. If the grace period has expired (for example, if the membership agent 420 was off for too long), the unavailable timestamp is reset to the current time.

The membership agent 420 gets notified when member sessions are created and lost. The membership agent 420 is responsible for replicating the member store 416 between all the member sessions and it is responsible for declaring members as permanently unavailable. Because the membership roster is fully replicated among all group members 140A-140N, a new member only needs to connect to one seed member. This is how the data replication framework 100 performs member discovery. The roster is replicated to the new member, and the new member is replicated to all the existing members. The new member does not need the seed anymore, because it has locally persisted the entire roster. Even though the data replication framework 100 can be configured with multiple seed hosts, these hosts might disappear when they are released. The loss of seed hosts will not affect existing group members, but it will prevent new members from joining. The seed host set will need to be updated to include members which are currently available. Seeding via a central database lookup, or via multicast, or via a pluggable discovery mechanism are other possibilities in other embodiments.

FIG. 5 is a flow diagram illustrative of interconnection of hosts routine implemented by the server registry. One skilled in the relevant art will appreciate that actions/steps outlined for routine 500 may be implemented by one or many computing devices/components that are associated with the server registry 304. Accordingly, routine 500 has been logically associated as being generally performed by the server registry 304, and thus the following illustrative embodiments should not be construed as limiting.

At block 504, when an eligible host connection is established to the server registry 304, the server registry 304 receives the services of that host. At block 508, the server registry generates a hash table of the remotely addressable services on the hosts. The table may include references or identifiers for remote objects available to the hosts. The table may also include all other connection information necessary for the hosts to access the remote objects. When a host connection becomes ineligible, the server registry 304 removes the services of that host from the table. At block 512, the server registry distributes the hash table to all other eligible hosts. When a host connection is established, the server registry 304 instructs all existing host sessions 140A-140N to connect to the new host. When a host connection is lost or removed because of a host becoming ineligible, the server registry 304 instructs all eligible hosts to not connect to the ineligible host. This forms a fully connected mesh network between all hosts 140A-140N where all the hosts 140A-140N are fully interconnected to one another. The server registry 304 thus acts like a directory service without a central server; it floats among hosts themselves.

FIG. 6 is a flow diagram illustrative of a routine for membership synchronization across hosts implemented by the membership module. One skilled in the relevant art will appreciate that actions/steps outlined for routine 600 may be implemented by one or many computing devices/components that are associated with the membership module 308. Accordingly, routine 600 has been logically associated as being generally performed by the membership module 308, and thus the following illustrative embodiments should not be construed as limiting.

As described in reference to FIGS. 4 and 5 above, host members 140A-140N are uniquely identified and can be remotely accessed. All members are aware of the existence of their peers, and they routinely check to ensure their availability. At block 604, the membership module 308 listens for new member session connections. If a new member connects, the membership module ensures that membership information is persisted along with the data replication framework's 100 data store, and any membership changes are replicated to all other members 140A-140N at block 608. In an illustrative embodiment, a new member need only connect to one host, or seed, to access the entire membership roster and become an equal member of the group.

At block 612, the membership module 308 verifies whether a member connection has been lost. If it has not been lost, the membership module continues to replicate the member store between member sessions (block 608). However, if the member connection has been lost, at block 616, the membership module attempts a reconnect and/or verifies whether the remote member has attempted to reconnect. If the reconnect is successful at block 620, the membership module continues to replicate the member store between member sessions (block 608). However, if the reconnect is unsuccessful, the membership module continues to attempt to reconnect and/or verify for attempts to reconnect from the remote host for a threshold amount of time at block 616. If within that threshold of time, the reconnection is successful, the membership module continues to replicate the member store between member sessions (block 608). However, if the reconnect attempts are unsuccessful after the threshold amount of time has been exceeded, the member may be declared permanently unavailable. This process is described further in connection with FIG. 7B below.

When a member detects that another has been unavailable for too long, it can declare it to be permanently unavailable. Once a member has been declared permanently unavailable, any pending updates to it can be safely discarded. Should the permanently unavailable member attempt to join the group again, it is denied membership. The permanently unavailable member's data store is considered to be too stale and it needs to generate a new identity and be restored from one of the available peers. Detection of temporarily and permanently unavailable members is described in further detail below.

Figure 7A:
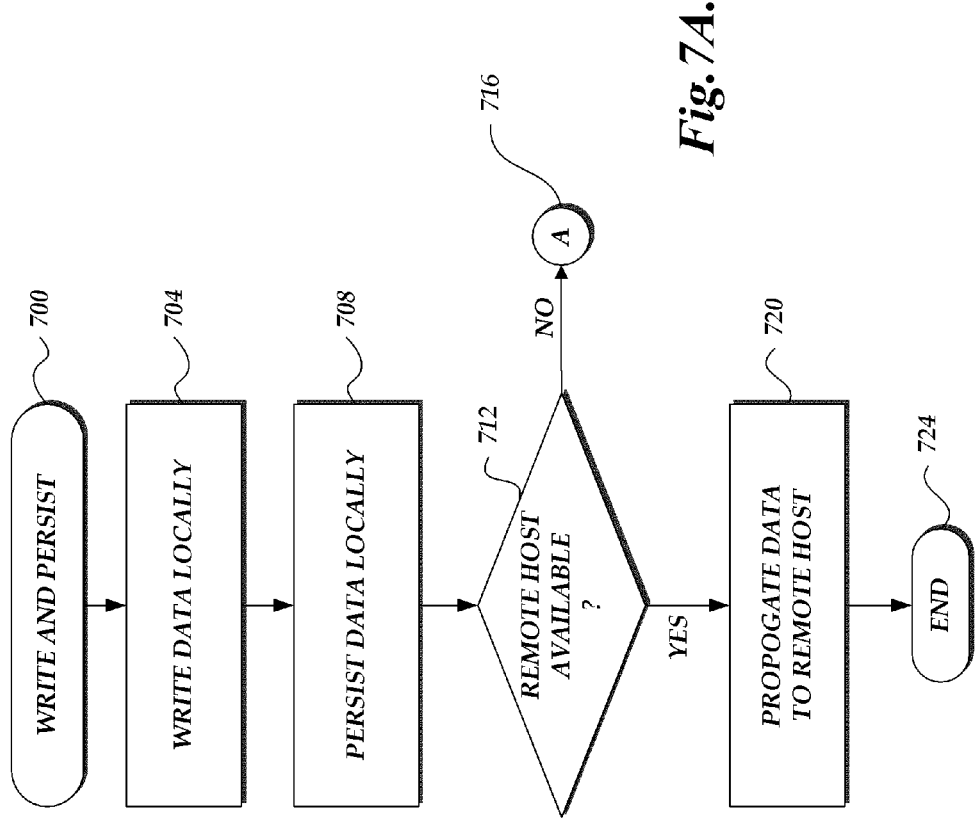
FIGS. 7A and 7B are flow diagrams illustrative of write and persist, and determination of member availability routines implemented by the data replication algorithm.
Figure 7B:
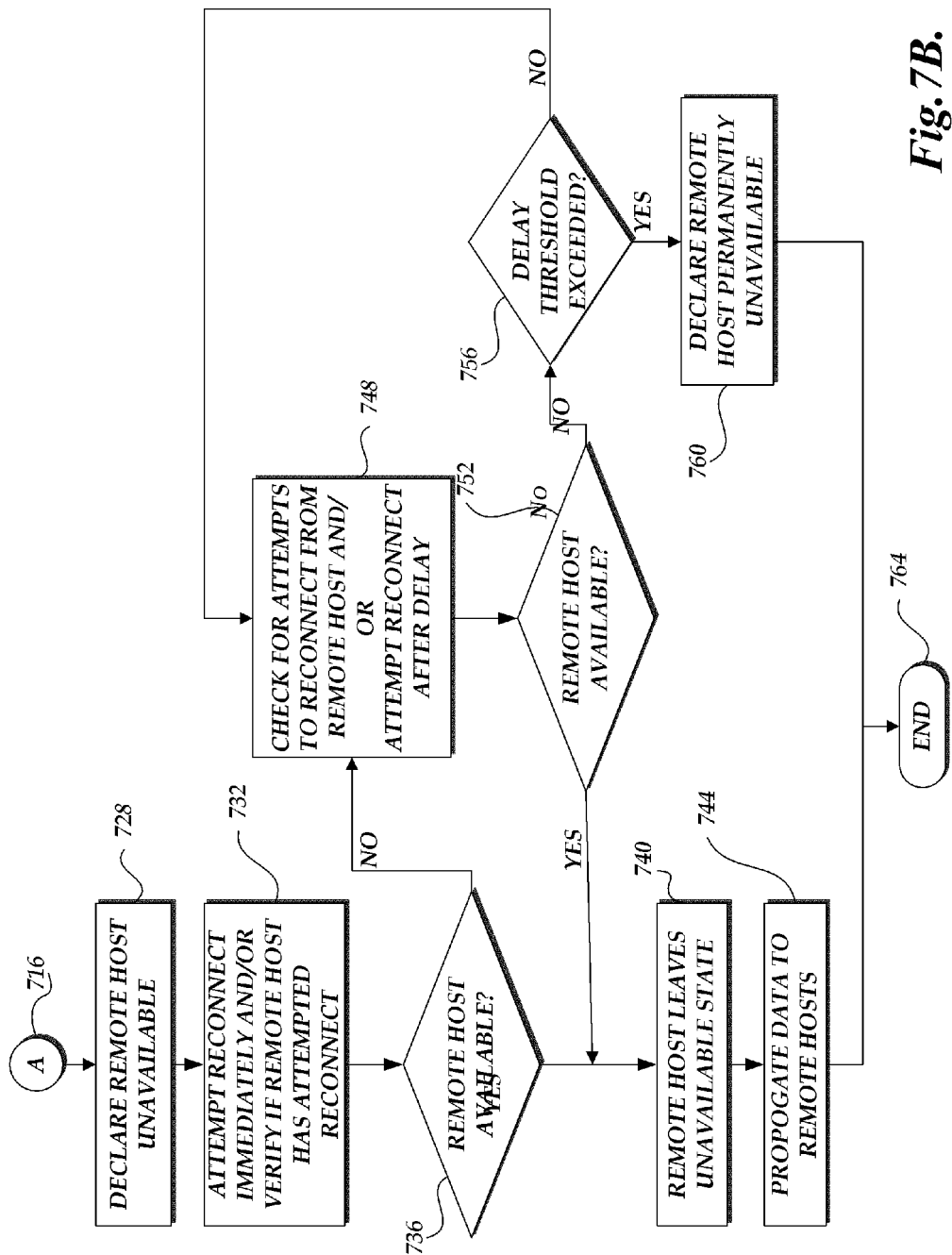

FIGS. 7A and 7B are flow diagrams illustrative of the write and persist routine of the data replication algorithm for available hosts, and determination of availability or permanent unavailability for hosts that are temporarily unavailable. With reference to FIG. 7A, at block 704, data is written locally to one of the hosts 140A-140N. At block 408, the data is persisted locally. At block 412, the data replication algorithm verifies whether a remote host to which data will be propagated is available. If the remote host is not available, the algorithm moves to block 716, described in connection with FIG. 7B below. If the remote host is available, the algorithm moves to block 720 to propagate the data to the remote host. Block 712 of the write and persist routine may be repeated for all remote hosts to which data is to be propagated for replication. Block 720 of the data replication algorithm may be repeated for all hosts which are available. After the data has been replicated to all of the available remote hosts, the replication algorithm ends at block 724. Block 716 may be repeated for all hosts which are unavailable on the first attempt.

As described briefly in connection with FIGS. 2A and 2B above, the data replication framework 100 is designed to ensure that data is ultimately consistent across all hosts 140A-140N. In some embodiments, the data replication framework 100 may also support additional features to further improve consistency. Returning to FIG. 7A, changes replicated at block 720 may be done by employing various replication strategies. In some embodiments, an "at least once" strategy may be employed, where a given change may be repeated more than once. In various embodiments, the change may be replicated twice, three times, or more. In some embodiments, record version numbers may also be used to decide if an incoming change is stale and should be rejected.

In addition, in some embodiments, before or after verifying the remote host is up at block 712, the data replication algorithm may designate one of the hosts as a recorder. The data replication framework 100 can be thought of as having two types of message streams, each of which deliver changes from one peer host 140A-140N to another. The first type of message stream may be a live stream, which includes changes created on a group member (the change sender), for delivery to the available group members. The recipients of these changes are either recording, or non-recording, receivers. The second type of message stream may be a standby stream, which includes changes that were not delivered as a part of the live stream, and are delivered via the standby stream. The bulk of the standby changes occur on account of an unavailable member 140A-140N missing changes that were delivered as a part of the live stream. Also, live stream messages that suffer from transmission issues, either in change delivery, or acknowledgment receipt, get resent as a part of the standby stream. Transmission of standby streams may be initiated by the change sender, or the designated recorder.

Change operations may utilize record version numbers for reconciling conflicts. If a change operation is received against a record version number older than what exists in the data store 170A-170N, it can be rejected. Several types of core operations may be performed on data records received during data replication, depending on designations associated with the data type, key, value and version. For example, in a STORE operation, a record may be forcibly stored by deleting any existing record. The given record version number is assigned to the newly stored record. In an UPDATE operation, a record may be inserted or updated. If a record already exists, the given record version number must be larger than the existing record version. In a PURGE operation, a record may be forcibly deleted by its key, ignoring any record version number. In a DELETE operation, a record may be deleted by its key. If a record already exists, the given record version number must be larger or equal to the existing record version. In a TRUNCATE operation, all records may be forcibly deleted for a given type.

Record version numbers may be compared using modulo arithmetic. This may allow them to wrap around without affecting the comparison, provided that the difference between the values is less than $2^{32}$. In some embodiments, timestamps may be used as version numbers. In some embodiments, record version numbers can be incremented with the help of an external database. In such embodiments, timestamps need not be used for record version numbers.

The data replication framework 100 provides for direct replication to peers 140A-140N. All members within a replication group maintain connections to each other. Remote calls can be made directly to any member, even asynchronous calls. The membership agent 420 provides a list of eligible members and also notes which are unavailable. Direct replication is basically implemented by sending a change to each available member, asynchronously. A change set can be sent from any member, and this same member (the sender) is responsible for directly replicating the change to all peers in the group. It does this by issuing a simple remote method call. Since a peer can be unavailable, the sender is responsible for resending the change set when the peer becomes available again. To guard against change loss, the sender persists replication state, so that it can resume replication of undelivered changes after restarting.

Because a sender can itself become unavailable all changes pending replication would be lost. When a replicated change set is created, the sender chooses additional peers to assume the role of recorders. The amount of recorders required is defined by configuration. In some embodiments, two recorders may be used. When the primary sender receives acknowledgment of a change, it also acknowledges to the recorders. If a recorder observes that the primary sender becomes unavailable, it handles delivery of the changes of the primary sender.

Direct replication follows a commit and propagate strategy. However, because additional information is persisted pertaining the replication itself in the data replication framework 100, the weaknesses of direct replication are avoided. In various embodiments of the data replication framework 100, all replication state is persisted in the same transaction as the change set (or change session), and so if replication is not possible, the entire transaction reverts back to its previous state.

As explained above, recorders are selected to redundantly store replication state. More recorders improve redundancy, but may reduce overall write throughput. The minimum and desired redundancy level may be configurable. If the desired redundancy level is zero, then no recorders need be selected. Only the original sender is responsible for resending changes in a standby stream. If the operating system crashes before all changes have been delivered, then the sender might lose the changes and not be capable to send the standby stream. As a result, the replication group may be inconsistent.

Illustratively, all available hosts are recorder candidates, which are selected immediately before the changes are committed. Recorder selection distributes the load among the hosts. All members must accept all changes. In some embodiments, random or round robin selection may be used for selection of recorders.

The sender of a change does not ordinarily receive its own changes back. Because the sender could lose its own non-committed changes after a reboot, it needs to restore recent changes from its recorders. For this reason, the recommended minimum redundancy level may be one in some embodiments. The sender is recorded as a receiver, but the change is initially acknowledged. Upon start up, members request all of their respective acknowledged changes from all peers.

Change sets may be assigned a unique identifier, or ID, which is provided by the initial sender. Change set IDs may be designed to support a natural ordering which loosely matches the order in which changes are sent. If a change could not be initially delivered, the standby stream will attempt to match the original order.

In order to persist data, an extra replication state may be stored by the sender of a change set, and the same state is stored by all selected recorders. The state is persisted in the same transaction as the change set, eliminating edge cases caused by commit and propagate style replication. Two tables may store replication changes. The first table may map change set ID to a serialized change set, the sender ID, and an array of recorder IDs. Sender and recorder IDs may be the same as member IDs, and the order of recorders may determine the preference of transmissions in the standby stream. Although a change set may include a time entry, a local timestamp may also be recorded in the replication change table.

The second table may contain a list of receivers for a change. It may have a composite key composed of the receiver ID and change set ID. A receiver ID may be just a member ID. The mapped value is an acknowledgment, represented by the receiver's checkpoint counter value. The existence of this value indicates that the receiver has acknowledged the change, but it has not durably persisted it yet. The record is deleted after it has been acknowledged and durably persisted.

After all receiver records for a change are deleted, the entry containing the serialized change set is deleted. In a healthy replication group, where all members are available, the replication state data exists only for a short period of time. Replication state for unavailable members is kept until the member becomes available again or is declared permanently unavailable.

Senders and recorders do not persist self entries in the replication receiver table, but recorders do persist a pre-acknowledged entry for the sender. This allows the sender to recover recently lost changes without requiring that changes always be broadcast back to it.

Following a peer data store transfer, the restored peer will have a complete copy of the replication state from its peer. Information pertaining to the peer may be removed after the transfer.

During initial propagation, immediately before a change set or change session is committed, the complete set of replication group peers is examined. From the replication group peers, recorders are selected based on the desired redundancy level. Recorders are also persisted as receivers, and all replication state entries are inserted as unacknowledged. Following selection of recorders, the transaction is committed, and then propagation can proceed. As an optimization, recorders can store a pre-acknowledged entry for the sender to avoid one additional round trip. For each receiver, an asynchronous remote call is made. For ordinary receivers, the call contains the sender ID, the change set ID, the recorder IDs, and the serialized change set data. Recorders are also passed all non-recorder receiver IDs. All receivers will apply the changes, but recorders will also insert replication state entries within the same transaction. After the receiver has committed the changes, it asynchronously notifies the sender and all recorders by passing back its own ID, the change set ID, and its checkpoint counter value. This is then persisted in the corresponding entry in the replication receiver table, indicating acknowledgment.

The data replication framework 100 waits for at least one recorder to receive the change. This avoids a change being committed locally, and then the sender becoming unavailable before having had a chance to replicate the changes to remote hosts. In some embodiments, hosts may have the option of waiting for acknowledgments from any kind of hosts, not just recorders.

The standby stream is a background thread which ensures that all unacknowledged changes are delivered. Every few seconds (or a different configurable time period), the replication receiver table is scanned in its natural order. This order is receiver ID, change set ID. Change set order approximately matches the time when the change was sent. To avoid overwhelming receivers during transmission of a standby stream, sends are not sent asynchronously. The sends are instead sent using a batched mode.

FIG. 7B illustrates the routine performed by the data replication algorithm after a host was unavailable on a first attempt at block 712 of FIG. 7A. At block 728, the host is declared unavailable. When the server registry 304 notifies the membership agent 420 that a member session is unavailable, the membership agent 420 then decides if it should attempt a reconnect. If the unavailable member exists in the member store 416 then the membership agent 420 considers the member to be temporarily unavailable and performs a reconnect attempt and/or verifies if the remote host has attempted a reconnect at block 732. If the attempt is successful, and the remote host is available (block 736), the remote host leaves the unavailable state at block 740, and the data is propagated to the host at block 744, and the data replication algorithm ends at block 764. However, if the reconnect attempt at block 732 is unsuccessful, and the remote host is still not available (block 736), then a subsequent reconnect is attempted at block 748.

The first reconnect/verification attempt at block 732 is performed immediately, and each subsequent reconnect/verification at block 748 is delayed. The first delay may be one second, and it may keep doubling up to, for example, two minutes. A member leaves the unavailable state (and reconnect attempts cease) when a reconnect succeeds or the unavailable member establishes a connection itself (block 752).

If a member is unavailable without interruption for an extended period of time (block 756), it is declared permanently unavailable at block 760. Illustratively, 20 hours may be a default threshold for the extended period of time. A shorter threshold merely means that an unavailable member might be declared permanently unavailable too soon, and might be forced to restore from a peer when it becomes available. If the data store is large, a full peer restore might take a long time, in which case it might be preferable to have missed updates played back instead.

When a member is declared permanently unavailable at block 760, this state transition is immediately replicated to all other members in the group. This ensures that if a member recently declared permanently unavailable reconnects, it gets promptly notified of its permanent unavailability state, no matter what member it connects to.

Because a member must be unavailable for an uninterrupted period of time in order to be declared permanently unavailable, restarting the membership agent 420 would interfere and possibly cause the verification of the member state to take longer. For this reason, the start time of the member's unavailable state may be persisted in the member store 416.

Returning to FIG. 7B, before the membership agent 420 attempts a reconnect at blocks 732 and/or 748, the membership agent 420 updates the persisted member state indicating that is the member is still unavailable. At a minimum, this simply updates the last modified field of the record. It may also set the start time for when the unavailable state was entered. When a member leaves the unavailable state at block 740, the unavailable start time field is cleared.

If the persisted member record already has an unavailable start time, it becomes the effective start time if the record was modified within the grace period. The grace period is defined to be double the maximum retry interval, which may be about four minutes in some embodiments.

When a member accepts a potential peer member session, it queries the member store 416 for the state of the peer member. If the member is new or known to be available, then both members synchronize their member store data. If the member has been declared permanently unavailable, it is treated as a compromised host, for example a zombie. With comprised hosts, the member store synchronization is not symmetrical. The member states provided by the compromised host are ignored.

By ignoring state provided by comprised hosts cascading the member unavailability state to connected members is prevented. In such a scenario, two members might declare the other permanently unavailable. This might be caused by a temporary network partition which lasted longer than the detection threshold for permanent unavailability. A simple cause might be a disconnected network cable, but not a power outage. In the worst case, an entire replication group could be declared permanently unavailable following a network partition. Since each side thinks the other side is permanently unavailable, it does not replicate any member state. This leads to a permanent network partition. In this state, members in the replication group will never reach consistency. Also, changes made by one side of the partition will always be ignored by the other.

Compromised hosts are most likely caused by a host being offline long enough to be declared permanently unavailable. The compromised host accepts the member states as provided by its peers, and upon doing so it learns that it was declared permanently unavailable. It then creates a new member ID, rejoins the group, and performs a backup restore from a peer. Logic for detecting compromised hosts prevents the entire replication group from being declared permanently unavailable following an extended network partition. In some embodiments, the data replication framework 100 can detect a permanent network partition, by simply observing pairs of compromised hosts, or two permanently unavailable members declaring the other to be permanently unavailable. The framework 100 may log errors, repeatedly, to ensure detection by a log scan monitor. It may be necessary in some embodiments to force all hosts on one partition to restore from the other.

Simple algorithms can be devised to automatically repair the permanent network partition. In one embodiment, the partition with majority (more members) may be selected to be correct. The minority may restore from peers in the majority.

In some embodiments, resiliency against extended network partition may be achieved by increasing the threshold time for declaring a member permanently unavailable. With a threshold of 20 hours, a network partition which is resolved within 20 hours may cause no harm. If longer network partitions are expected, the threshold may be increased to a longer period of time. In other embodiments, one partition of hosts may be deactivated during a large scale network outage, and only reactivated once the network is restored. In such embodiments, only the reactivated hosts will be declared permanently unavailable, and they can restore from the peers in the other partition.

All host members within the data replication framework 100 locally persist their member ID, and they also locally persist a replication group ID. Like the member ID, the group ID is a randomly assigned ID. The purpose of the group ID is to ensure that misconfigured replication groups cannot merge together.

For illustration, consider two replication group sets: {A, B} and {C, D}. If the first set was only seeded with A and B, then it will have no knowledge of the second set. Likewise, if the second set was only seeded with C and D, it will be unaware of the first set. The two sets are different partitions. If a configuration error causes set {A, B} to become aware of C, the two sets union into a combined replication group: {A, B, C, D}. Since the two groups were not together initially, their data sets will be divergent, and a merge can create irreconcilable inconsistencies. By giving each group a unique ID, the merge is not allowed. The data replication framework 100 may log errors when such an attempt is made.

When a host first joins a replication group, it acquires the group ID of the first seed it was able to contact. If no seed can be contacted, the host might be the first in the group. By default, a new host may wait up to a threshold amount of time, such as for example, 15 seconds, before forming its own group. Other time periods are also possible. If there is a network partition during the deployment of the new host, it may erroneously form a new group, which causes a different kind of permanent network partition. As described earlier, when a groups attempt to merge back, the data replication framework 100 detects and logs these attempts as errors.

If a new replication group is being formed and several hosts are all first, they might all form independent groups. To prevent this, a in some embodiments, a mini master election algorithm may be used during the join period. The new hosts detect the existence of each other as they connect during the initial join wait period. They then exchange their candidate group IDs, and the one which is comparably lower than the other is used instead.

In other embodiments, there may be an option to disable automatic group assignment. A manual self-generating or self-sustaining (bootstrap) process may be used in such embodiments, using two deployments, the first with automatic group assignment enabled, and the second with automatic group assignment disabled.

The data replication framework 100 as described above may assume that all members in a replication group are within the same LAN, or data center. Bandwidth may be expected to be high and latency may be expected to be low. All members maintain connections to each other, and each is capable of performing the same data replication actions. In some embodiments, the data replication framework 100 can also be used over a WAN. Replication groups across a WAN may be mostly isolated. A leader election process may choose which local members send changes over the WAN. The leader election process may also choose which remote members receive changes over the WAN. In some embodiments, there may be multiple leaders elected.

Members on each side of the WAN are provided with completely different group IDs. If the same group ID were used, the two sides may learn of each other's existence. If this happens, they will exchange the complete membership roster and form a single fully connected network, defeating the formation of replication groups across the WAN.

Separate group IDs also allow for one-way replication, which may be performed in either a LAN or a WAN framework. The separate group IDs make it possible to aggregate several data stores into one, for example. Group ID separation also helps ensure that problems affecting one data center do not significantly impact services in another data center. The replication link can be severed in an emergency, and replication within the data centers continues to work normally. For LAN replication, a set of seed hosts to initially join a replication group may be configured. For WAN replication, seed hosts which reside in different groups may be configured. Multiple WAN destinations can be configured with this strategy as well.

When the core replication interface 424 first starts, it needs to contact at least one member in the remote group. It then locally persists its group ID associated with the configured group name. On subsequent starts, it does not need to immediately contact any remote group member, because the group ID is known. It will keep trying to connect to at least one member, logging an error if failed, forever. Unreplicated changes will also pile up forever.

To stop replicating to a group, configuration for it must be removed. All unreplicated changes for the group will be purged when the system is restarted with the new configuration. With WAN replication the recorders are additionally responsible for replicating changes to the remote group. By choosing a leader recorder/replicator, the number of connections established over the WAN is reduced. If multiple leaders exist at any time, extra connections are created, but this does not corrupt the data store, since the data replication framework 100 relies on record version numbers to discard stale or duplicated changes.

In some embodiments, leader election for WAN replication may be accomplished by examining the member IDs of all members, and to choose the members with the lowest IDs. If one of the leaders becomes unavailable, it loses its leader status until it becomes available again. Leader election on the send side of replication reduces the number of connections over the WAN, and doing the same on the receiving side reduces it further. With no leaders at all, the number of required connections scales as m*n, where m and n are the member counts on each side. With leaders on one side, the number of connections is m or n, but with leaders on both sides, the number of connections is 1.

The sender of a change in data may ask any member of the remote group for the leader. The sender only keeps a connection to the leader and sends all changes to it. In turn, the remote leader replicates all changes to the members of its group.

When a host data store is first created or an existing data store has been declared permanently unavailable, it acquires a complete copy of the data store from a peer in the replication group. If no peers exist, then an empty data store is created instead. During a restore, the peer supplying the copy remains online. The host data store continues to perform ordinary operations, although the host load is slightly higher. Any updates which are applied during the transfer are delayed, and they are received after the transfer is complete.

FIG. 8 is a flow diagram illustrative of determination of query distribution implemented by the query analysis module. One skilled in the relevant art will appreciate that actions/steps outlined for routine 800 may be implemented by one or many computing devices/components that are associated with the query analysis module 316. Accordingly, routine 800 has been logically associated as being generally performed by the query analysis module 316, and thus the following illustrative embodiments should not be construed as limiting. The query analysis module 316 may be used to perform relational style queries on local hosts. The query analysis module 316 may convert the relational style query into formats understood by local data stores. The query analysis module 316 may also be used for performing query analysis and distribution, as illustrated in FIG. 8.

Query analysis starts at block 804 where queries received at the hosts are analyzed by the query analysis module 316. Although all hosts have a replicated copy of the same data store, the queries received at each of the hosts may have different frequencies. For example, data associated with a given ProductID may be queried on one host, and that ProductID may be a popular one, causing several queries on that host, creating a hot spot. However, a request associated with a CustomerID for that same ProductID might send the query to a different host. Therefore, the queries are analyzed, and a determination is made of where queried data is located, at block 808. From this analysis, a distribution of requests is inferred by the query analysis module at block 812. The distribution of requests inferred is used to try to route requests away from potential hot spots by a router implemented by a dynamic routing request module. In some embodiments, the inferred distribution may include a histogram. The inferred distribution constantly adjusts itself, and aims to approximate even distribution of requests across hosts. In order to achieve a more ideal distribution, a range of keys is created at block 816, and the query analysis module ends at block 820.

Request routing is a method of partitioning the request stream to minimize disk accesses on the cluster of hosts. A query may include a key class, wherein a key may be any type of request, and a comparator to compare keys. A router may determine which host every request goes to, based on dividers generated by a key store. The router may maintain an ordered list of hosts, where the hosts are comparable. Such a list helps maintain consistency among separate applications that may be using the same set of hosts. When a new host is added, the host is inserted in order. The dividers are generated to account for the new host. Similarly, when a host is removed, the dividers are regenerated. The key store stores a sorted multiset (or a set that allows for duplicates) of the most-recently used keys. For every n-th key coming into the router, the router also sends it to the key store. The router asks the key store to generate a list of dividers to help the router to decide which host a request should be routed. A divider helps the router decide to which host to route a request. The divider contains a key to compare the request to, an initial host offset index, and a list of probabilities (summing to 100% or 1).

When the router is first turned on, the key store is empty, and therefore it cannot generate dividers. Thus, the first requests may be randomly routed, and then seeded to the key store. When the key store gets full, the router begins to route by ranges.

Hosts frequently become unavailable and then available again, and sometimes more hosts need to be added or removed. When the router detects that there is a change in the number of available hosts, it immediately regenerates dividers again so that the load is evenly distributed.

The method of routing used may be based on ranges of request keys. With a cluster of hosts, the first host would handle the first fraction of keys, the second host would handle the second fraction of keys, and so on. This method of routing would distribute keys to hosts evenly and decrease the probability of disk accesses. Due to fluctuations, trends, and hotspots, the ranges should be dynamically adjusted to adapt to the constantly changing popularity of keys. One embodiment keeps samples of the most recently used keys and, based off of the samples, distributes the request stream. In some embodiments, the algorithm may employ a strategy where the range of keys that is routed to specific hosts changes based on traffic. Different hosts would have a different key range going to them based on what items are hot. This would help spread the load across the system and account for variations in load.

A parameter of the algorithm may be to determine the number of keys to store in the keystore. A larger capacity may be better for steady, constant request streams, while a smaller capacity may be better for request streams that fluctuate rapidly. In some embodiments, the number of keys may be 1000. In other embodiments, the number of keys may be more or less than 1000.

Another parameter of the algorithm may be to determine the period of updating the dividers. A shorter period may make the dividers reflect a more recent past request stream but may come with a performance trade-off. In some embodiments, the number of keys may be 1000. In other embodiments, the number of keys may be more or less than 1000.

Figure 9:
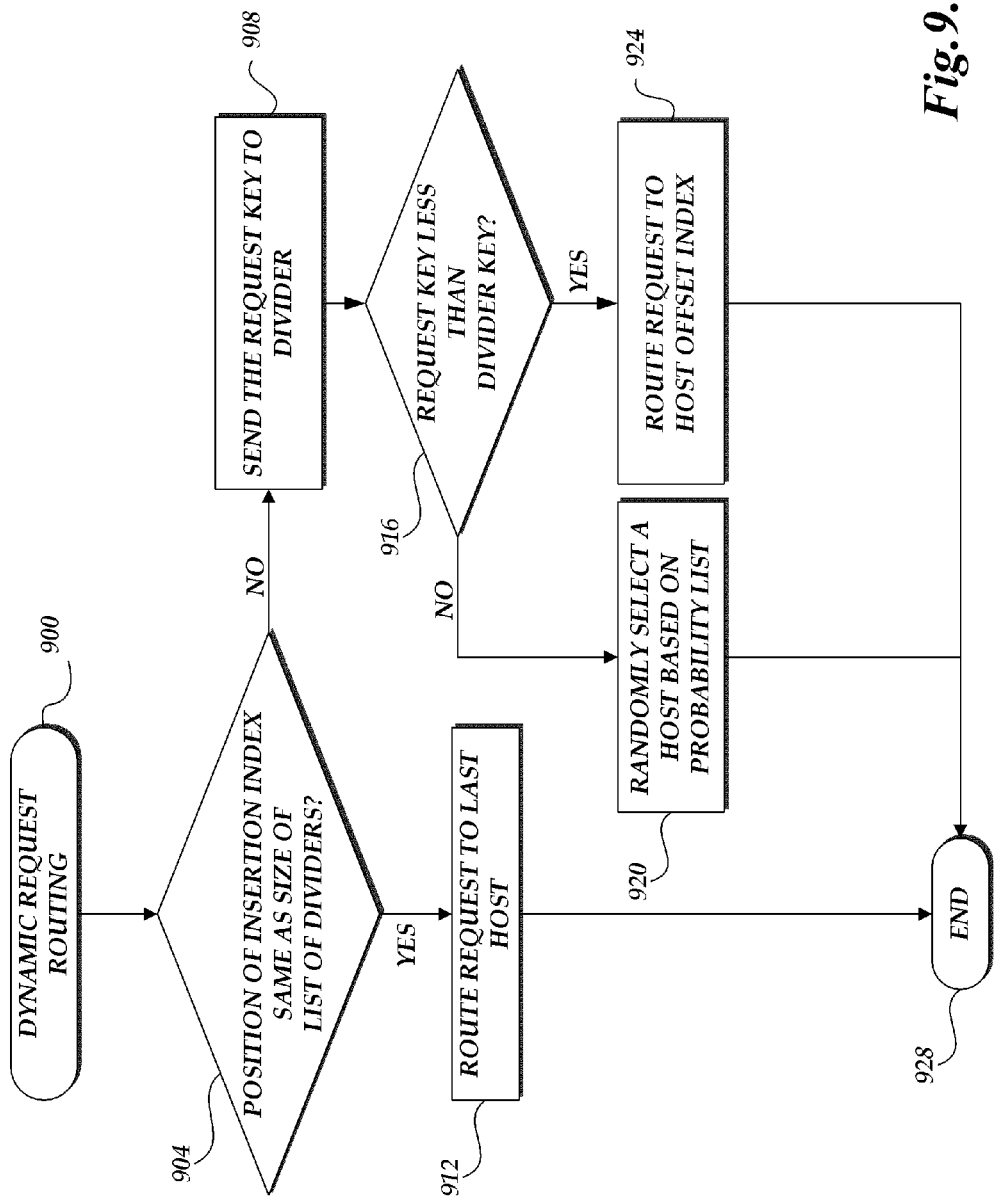
FIG. 9 is a flow diagram illustrative of dynamic request routing implemented by the dynamic request routing module.

FIG. 9 is a flow diagram illustrative of some functions implemented by the dynamic request routing routine module. When a request comes in, the router searches for the insertion index of the request key in the list of dividers (which contains a key for comparison) at block 904. If the insertion index is the size of the list (should be inserted at end of list), the request is routed to the last host at block 912. Alternatively, if insertion index is not the same as the size of the list, the router sends the request key to the divider for it to decide at block 908.

When the divider receives a request key, it checks if the request key is less than its own key at block 916, and if true, tells the router to route the request to the host offset index (the first possible host associated to a divider) at block 924. If the request key matches the divider's key, the divider randomly selects a host based on its list of probabilities, at block 920. The first element corresponds to the initial host, the second element corresponds to the host to the right of the initial host, and so on.

An example is provided for illustrative purposes. Suppose there are 5 hosts and a key store capacity of 20, shown below with respective dividers:

| Dividers: |   |   |   |   | D |   |   |   |   |   | - |   |   |   | - |   | D |   |   |   |
|---|---|---|---|---|---|---|---|---|---|---|---|---|---|---|---|---|---|---|---|---|
| Indices: | 0 | 1 | 2 | 3 | 4 | 5 | 6 | 7 | 8 | 9 | 0 | 1 | 2 | 3 | 4 | 5 | 6 | 7 | 8 | 9 |
| Keys: | 1 | 1 | 1 | 1 | 2 | 2 | 2 | 2 | 2 | 2 | 2 | 2 | 2 | 4 | 6 | 6 | 6 | 7 | 7 | 7 |
| Hosts: | [------0------] | | | | [------1------] | | | | [------2------] | | | | [------3------] | | | | [------4------] | | | |

In this example, there are 2 dividers. There are no dividers at indices 8 and 12 because they have the same key as a previous divider, namely the divider at index 4. The first divider has key 2, a host offset index of 0 (since this is the first divider, and the host to the left of the divider has index 0), and a probability list of {0, 4/9, 4/9, 1/9}. The first probability is 0, since there are no 2's in (0, 3). The next two probabilities are both 4/9, since there are four 2's in (4, 8) and (9, 12) and nine 2's in total. Finally, the last probability is 1/9, since there is one 2 in (13, 16). The second divider has key 6, a host offset index of 3 (the host to the left of the divider is host 3), and a probability list of {2/3, 1/3}.

If a request key of 1 comes in, the insertion index of 1 in the divider list is 0 (divider at index 4). The divider sees that 1 is less than its key, so immediately returns the host offset index, 0. If a request key of 2 comes in, the insertion index of 1 in the divider list is 0, again. The divider sees that the keys match, so it randomly selects a host based on the probabilities. Thus, the 2 will be never be routed to host 0, it will be routed to host 1, 44.4% of the time, it will be routed to host 2, 44.4% of the time, and it will be routed to host 3, 11.1% of the time.

If a request key of 3 comes in, the insertion index of 3 in the divider list is 1 (divider at index 16). The divider sees that 3 is less than its key, so immediately returns the host offset index, 3. If request key of 7 comes in, the insertion index of this request key would be to the right of the dividers, so the router immediately routes it to the last host, host 4.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method of dynamically routing requests of data across a plurality of hosts, the method comprising:
   analyzing queries for data at a plurality of hosts, wherein individual hosts have a replicated copy of a data store;
   determining frequency of queries for data among the plurality of hosts;
   determining distribution of queries for data based on the determined frequency of queries for data among the plurality of hosts;
   generating an insertion index for data requests based on the determined distribution of queries for data;
   generating a list of dividers based on a count of the plurality of hosts, wherein the list of dividers is associated with a comparison key, and wherein the list is regenerated when the count of the plurality of hosts is changed; and
   routing data requests based on the insertion index and the list of dividers wherein routing data requests includes:
      determining a size of the insertion index and a size of the list of dividers;
      comparing the size of the insertion index to the size of the list of dividers;
      routing the request to a last host added to the plurality of hosts in response to determining that the size of the insertion index is the same as the size of the list of dividers;
      comparing a request key associated with the data request to the comparison key in response to determining that the size of the insertion index is different than the size of the list of dividers;
   wherein the method is performed on a computing device comprising a processor and memory.

2. The method of claim 1, wherein the queries for data comprise a data index.

3. The method of claim 2, wherein the data index comprises at least one of a product identity index, a customer identity index and a review identity request.

4. The method of claim 1, wherein the distribution of queries comprises a histogram.

5. The method of claim 1, wherein the data requests are routed to at least one of the plurality of hosts.

6. The method of claim 1 further comprising regenerating the list of dividers at a predetermined frequency.

7. The method of claim 6, wherein the predetermined frequency is 1 second.

8. A computing system for dynamically routing requests of data across a plurality of hosts, the system comprising:
- a plurality of hosts configured to receive queries for data, wherein individual hosts have a replicated copy of a data store;
- a query analysis component configured to determine a distribution of the queries for data received based on a frequency of queries for data among the plurality of hosts; and
- a router configured to route a data request to at least one of the plurality of hosts based on an insertion index of a request key and a list of dividers, wherein the list of dividers is associated with a comparison key and wherein the router routes a data request by:
- determining a size of the insertion index and a size of the list of dividers;
- comparing the size of the insertion index to the size of the list of dividers;
- routing the request to a last host added to the plurality of hosts in response to determining that the size of the insertion index is the same as the size of the list of dividers;
- comparing a request key associated with the request for data to the comparison key in response to determining that the size of the insertion index is different than the size of the list of dividers.

9. The computing system of claim 8, wherein the queries for data comprise a data index.

10. The computing system of claim 9, wherein the data index comprises at least one of a product identity index, a customer identity index and a review identity request.

11. The computing system of claim 8 wherein the router is further configured to regenerate the list of dividers periodically.

12. The computing system of claim 8, wherein the router is further configured to detect a change in a number of hosts and, upon detection, to regenerate the list of dividers.

13. A method of dynamically routing requests of data across a plurality of hosts, the method comprising:
- analyzing queries for data at a plurality of hosts, wherein individual hosts have a replicated copy of a data store;
- determining distribution of queries for data based on a frequency of queries of data among the plurality of hosts; and
- routing requests for data based on an insertion index of a request key and a list of dividers, wherein the list of dividers is associated with a comparison key and wherein routing requests includes:
  - determining a size of the insertion index and a size of the list of dividers;
  - comparing the size of the insertion index to the size of the list of dividers;
  - routing the request to a last host added to the plurality of hosts in response to determining that the size of the insertion index is the same as the size of the list of dividers;
  - comparing a request key associated with the request for data to the comparison key in response to determining that the size of the insertion index is different than the size of the list of dividers;
- wherein the method is performed on a computing device comprising a processor and memory.

14. The method of claim 13, wherein the queries for data comprise a data index.

15. The method of claim 14, wherein the data index comprises at least one of a product identity index, a customer identity index and a review identity request.

16. The method of claim 13, wherein the distribution of queries comprises a histogram.

17. The method of claim 13, wherein the requests are routed to at least one of the plurality of hosts.

18. The method of claim 13 further comprising updating the list of dividers at a predetermined frequency.

19. The method of claim 13 further comprising generating keys for data requests based on the determined distribution of queries for data.

* * * * *